(12) United States Patent
Neuwirth

(10) Patent No.: US 6,704,614 B1
(45) Date of Patent: Mar. 9, 2004

(54) VERIFICATION SYSTEM FOR VALUE ADDED INDICIA APPLICATORS

(76) Inventor: Mark F Neuwirth, c/c The Pick Systems Group Inc. P.O. Box 278, Manasquan, NJ (US) 08736

(*) Notice: Subject to any disclaimer, the term of this patent is extended or adjusted under 35 U.S.C. 154(b) by 0 days.

(21) Appl. No.: 10/207,095

(22) Filed: Jul. 30, 2002

(51) Int. Cl.[7] .............................. G06F 7/00
(52) U.S. Cl. ............. 700/216; 700/226; 700/227
(58) Field of Search .............................. 700/216, 219, 700/224, 226, 227

(56) References Cited

U.S. PATENT DOCUMENTS

| | | | |
|---|---|---|---|
| 4,265,355 A | | 5/1981 | Davis |
| 4,462,851 A | | 7/1984 | Colgate |
| 4,648,933 A | | 3/1987 | Graziano |
| 4,664,740 A | | 5/1987 | Wilkinson |
| 4,858,138 A | * | 8/1989 | Talmadge ............... 705/408 |
| 4,955,948 A | | 9/1990 | Focke |
| 5,168,883 A | | 12/1992 | Winn |
| 5,375,172 A | * | 12/1994 | Chrosny ............... 705/62 |
| 5,408,927 A | | 4/1995 | Gallagher |
| 6,360,208 B1 | | 3/2002 | Ohanian et al. |
| 2001/0032138 A1 | | 10/2001 | Janiak |

* cited by examiner

*Primary Examiner*—Gene O. Crawford
(74) *Attorney, Agent, or Firm*—Seth Natter; Natter & Natter

(57) ABSTRACT

A verification system for a value added indicia applicator such as a cigarette fusion tax stamping machine at a cigarette distribution center includes a processor associated with the tax stamping machine. The processor receives data comprising the requirements for a specific run, order or distribution route. A scanner identifies cartons of cigarettes prior to reaching a station at the machine which opens the carton flaps and the processor verifies if the identified carton is part of the run being processed. If the identified carton is not part of the run, the stamping machine operation is interrupted and/or the improper carton is ejected.

20 Claims, 4 Drawing Sheets

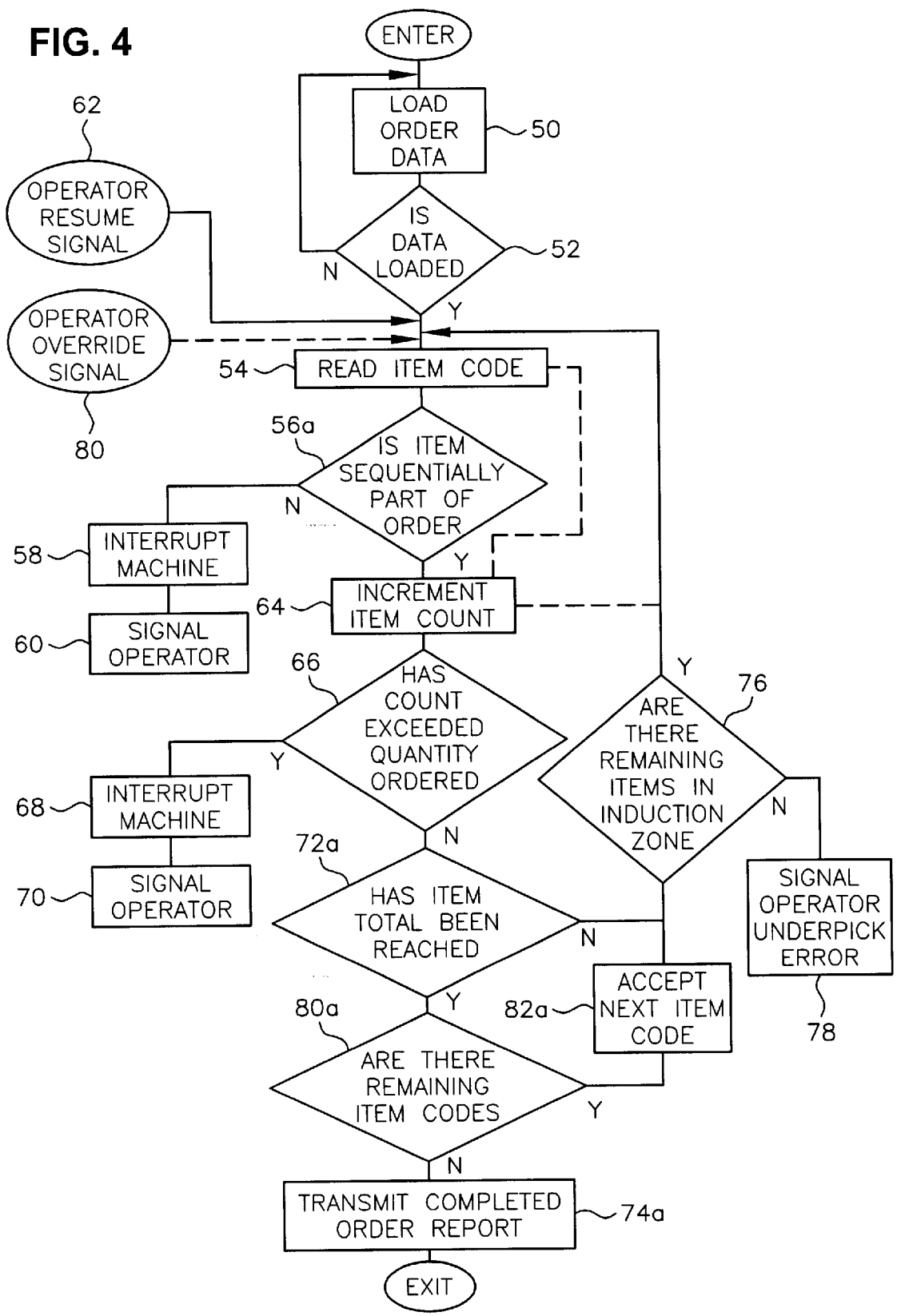

VERIFICATION SYSTEM FOR VALUE ADDED INDICIA APPLICATORS

BACKGROUND OF THE INVENTION

1. Field of the Invention

This invention relates generally to value added indicia applicators such as cigarette tax stamp applicators and more specifically to a system for assuring that value added indicia will not be applied to an item which is not part of an order being processed for shipment.

2. Antecedents of the Invention

Various cigarette tax stamping machines and improvements thereon are illustrated in the Patents to WINN (U.S. Pat. No. 5,168,883), WILKINSON (U.S. Pat. No. 4,664,740), GRAZIANO (U.S. Pat. No. 4,648,933), COLGATE (U.S. Pat. No. 4,462,851) and DAVIS (U.S. Pat. No. 4,265,355).

These tax stamping machines generally processed selected cigarette cartons by opening the flaps of each carton, applying the jurisdictional tax stamps to the ends of the cigarette packages in each carton and resealing the carton flaps.

Cigarette distributors who were required to apply tax stamps to cigarette packages had the option of either stamping all cigarette packages prior to receipt and picking of orders for shipment to specific jurisdictions, i.e. pre-order stamping, or stamping cigarette packages after receipt and picking of an order, i.e. post-order stamping.

Although pre-order stamping afforded the distributor the advantage of minimizing stamping labor costs, many disadvantages were associates with pre-order stamping, including excessive warehousing requirements and inventory control difficulties.

For example, a specific brand and size cigarette package would be assigned by the manufacture with scanable SKU (stock keeping unit) code or UPC code (universal product code), however, with pre-order stamping, the same SKU and/or UPC code would be applicable to multiple items, each unique because of the specific jurisdictional tax stamps applied by the distributor. The manufacturer SKU or UPC code no longer provided a unique identification.

Post-order stamping cigarette distributors who supply distribution channels in more than one taxing jurisdiction employed cigarette tax stamping machines to process picked orders of multiple items, i.e. brands, sizes, etc., each having a unique scanable code, such as an SKU code, prior to packing the order for shipment.

Although warehousing requirements were reduced an inventory control was simplified with post-order stamping, there remained significant problems with respect to the application of tax stamps to packages of incorrectly picked cartons and verification of order picking errors.

More specifically, when a particular item was incorrectly picked and was not part of an order being processed for shipment, or an item was overpicked in quantity, the error was generally not discovered until after tax stamps had been applied to the improperly picked items. Improperly stamped cartons were required to be restocked for future shipment only to the applicable taxing jurisdiction, entailing special restocking procedures.

Further, the correct items to complete the order were required to be repicked and then run through the stamping machine, requiring a second run. This resulted in significant expenses, not only in increased labor and special stocking requirements, but additionally, due to the reduced throughput of the stamping machines. Maximum efficiency was achieved only when the stamping machines processed properly picked orders in a single run.

SUMMARY OF THE INVENTION

A verification system for a value added indicia applicator such as a cigarette tax stamping machine includes a processor which stores data comprising the requirements of an order being processed for shipment. As the cigarette cartons in fulfillment of the order are inducted toward a carton flap opening station of the stamping machine, a scanner reads the identification code e.g. SKU, UPC, etc., on each carton and the processor compares the scanned code with the stored order requirements data. If the scanned code identifies an item comprising part of the order, the item is counted and the stamping machine proceeds with the tax stamping operation.

If the item scanned is not part of the order or is in excess of the number of items comprising the order, the processor interrupts the operation of the stamping machine and an operator alert is activated for correction of the error.

Optionally, the processor may activate an ejector to remove the incorrect items and notifies the operator of all picking errors after the last correct item has been stamped.

From the foregoing compendium, it will be appreciated that it is an aspect of the present invention to provide a verification system for value added indicia applicators of the general characters described which is not subject to the disadvantage of the antecedents of the invention aforementioned.

A feature of the present invention is to provide a verification system for value added indicia applicators of the general character described which eliminates the necessity of restocking items to which value added indicia has been applied.

A consideration of the present invention is to provide a verification system for value added indicia applicators of the general character described which is simple to use and operator friendly.

Another aspect of the present invention is to provide a verification system for value added indicia applicators of the general character described which optimizes the productivity of a cigarette distribution center.

Another feature of the present invention is to provide a verification system for value added indicia applicators of the general character described which assures that only complete orders will be packed for shipment.

Another consideration of the present invention is to provide a verification system for value added indicia applicators of the general character described which alerts a tax stamping machine operator in the event a specific item of an order being processed has been underpicked.

To provide a verification system for value added indicia applicators of the general character described which interfaces with existing cigarette tax stamping machines is a further aspect of the present invention.

An additional feature of the present invention is to provide a verification system for value added indicia applicators of the general character described which reduces order picking errors.

A still further consideration of the present invention is to provide a verification system for value added indicia applicators of the general character described which assures that value added indicia will not be applied to a specific item of an order in excess of the quantity ordered.

Another aspect of the present invention is to provide a verification system for value added indicia applicators of the general character described which assures that value added indicia will not be applied to an item which was not part of an order being processed for shipment.

Other aspect, features and considerations of the present invention in part will be obvious and in part will be pointed out herein after.

With these ends in view, the invention finds embodiment in certain combinations of elements, arrangements of parts and series of steps by which the aforesaid aspects, features and considerations and certain other aspects, features and considerations are attained, all with reference to the accompanying drawings and the scope of which will be more particularly pointed out and indicated in the appended claims.

BRIEF DESCRIPTION OF THE DRAWINGS

In the accompanying drawings in which is shown one of the various possible exemplary embodiments of the invention:

FIG. 4 is a schematized representation of a modified routine of the verification system processor.

DESCRIPTION OF THE PREFERRED EMBODIMENT

Figure 1:
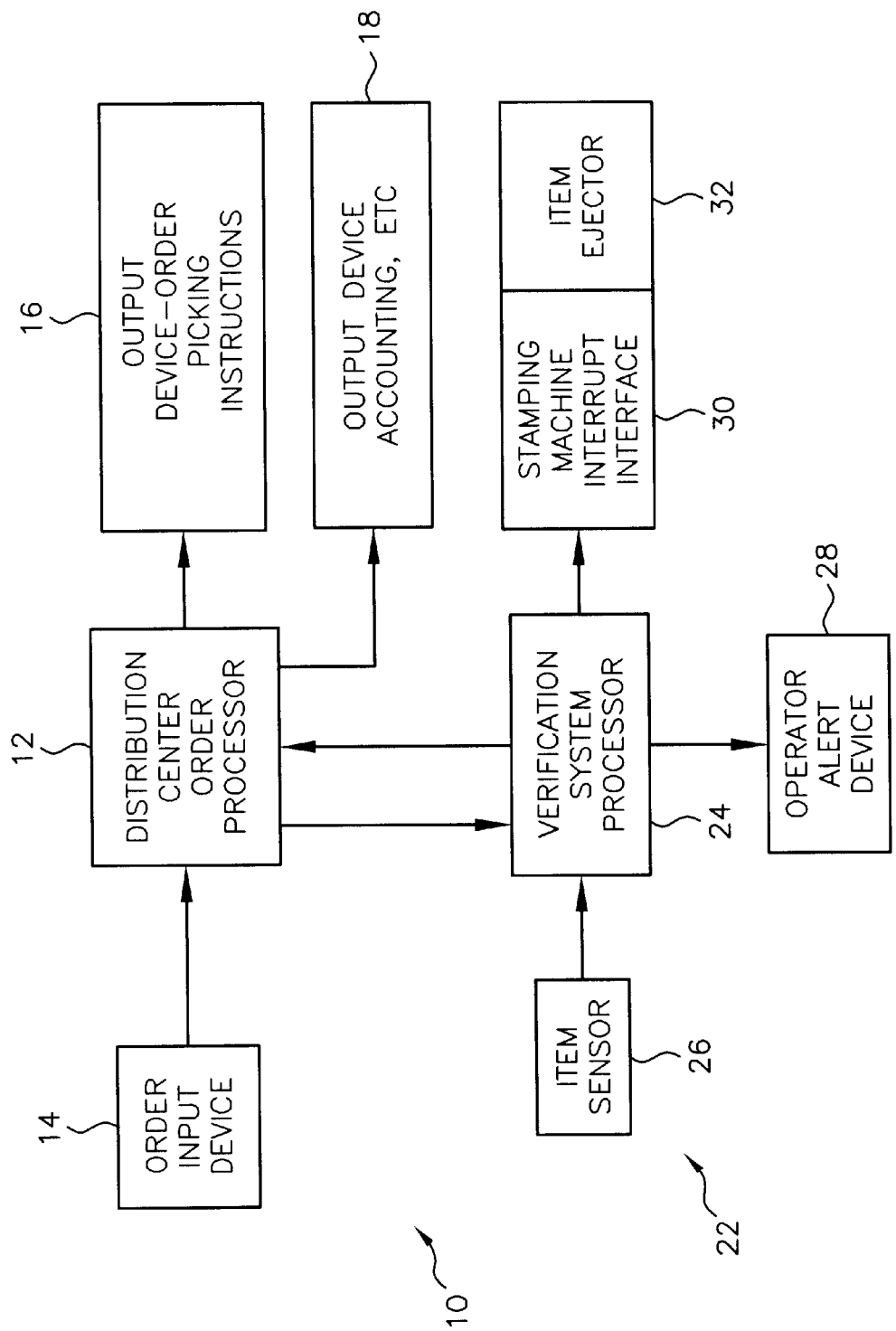
FIG. 1 is a schematized view of various components of an order processing system at a distribution center wherein value added indicia is applied to items and illustrating the relationship between a distribution center order processor and a verification system constructed in accordance with and embodying the invention.

Referring now in detail to the drawings, the reference numeral 10 denotes generally a distribution center order processing system wherein value added indicia are applied to items prior to packaging for shipment. The distribution order processing system 10 generally includes a distribution center order processor 12 which receives and processes an incoming order from an order input device 14. The term "order" includes any batch, wave, run, distribution route, etc. The input device 14 may comprise a keyboard, a touch screen, a portable data entry device, such as those sold under the trademark TELXON, or a web interface to a remote entity in the distribution chain, such as a retailer or wholesaler. The distribution center processor 12 generates order picking instructions which are transmitted to an output device 16. A further output device 18, for accounting or other purposes, may be associated with the order processor 12.

Figure 2:
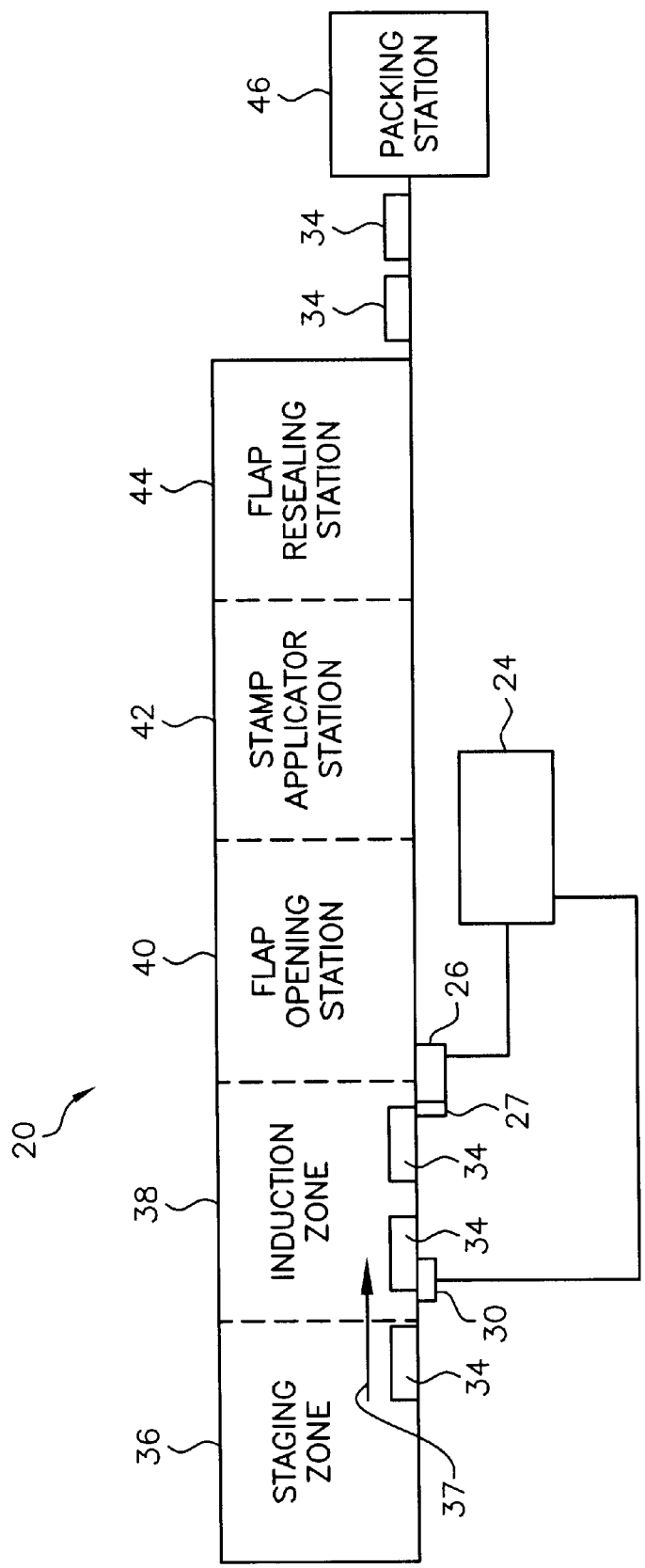
FIG. 2 is a schematized illustration of an order processing line at the distribution center including a tax stamping machine and illustrating a typical placement of a sensor which is in communication with a verification system processor pursuant to the invention.

The distribution center includes a value added indicia applicator such as a cigarette tax stamping machine, designated generally by the reference numeral 20 in FIG. 2. The tax stamping machine 20 may comprise any commercially available tax stamping machines, such as, the Meyercord Fusion Tax Stamping System, available from Meyercord Co., of Carol Stream Ill., or a machine as disclosed in any of the patents to WINN (U.S. Pat. No. 5,168,883), WILKINSON (U.S. Pat. No. 4,664,740), GRAZIANO (U.S. Pat. No. 4,648,933), COLGATE (U.S. Pat. No. 4,462,851) or DAVIS (U.S. Pat. No. 4,265,355), each of which is incorporated herein by reference.

Pursuant to the invention, a verification system 22 interfaces with the tax stamping machine 20 and monitors the items of a picked order prior to commencement of the tax stamping operation to assure that improperly picked items will not be stamped and also to assure that only a completely filled ordered will be processed for packing.

The verification system 22 includes a verification system processor 24 which receives and stores data comprising the requirements of the specific order being processed for shipment.

The processor 24 is coupled to an input device comprising an item sensor 26 which may comprise an optical code reader or other scanning device which reads an identification code, such as a bar coded SKU or a UPC code, on each carton being induced into the tax stamping machine 20.

The processor 24 determines whether the identified item is part of the order being processed by comparing the scanned code with the stored data. If the scanned code identifies an items comprising part of the order data, the item is counted and the stamping machine proceeds with the stamping operation.

If the scanned code is not part of the order being processed or is in excess of the number of such items within the order, the processor 24 interrupts operation of the tax stamping machine 20 through an interrupt interface 30 and also generates a visual and/or audible operator alert through an alert device 28. Optionally, the processor 24 may eject the incorrect item, utilizing an ejector 32 such as that disclosed in the patent to WINN U.S. Pat. No. 5,168,883, with or without interrupting the operation of the tax stamping machine.

Referring now the FIG. 2, wherein various stations of the tax stamping machine 20 are depicted in schematized format along a production line, individual cigarette cartons 34 of a picked order are unloaded and oriented for feeding into the tax stamp machine 20 at a staging zone 36. From the staging zone 36, individual cartons 34 are fed along a flow path 37 to an induction zone 38. It has been found that in conjunction with the Meyercord fusion tax stamping system, an optical scanner 26 may be positioned beneath the bed of the tax stamping machine 20, between the induction zone 38 and a carton flap opening station 40. The scanner 26 reads an optically scanable code on each carton as it transverses the flow path 37. A suitable space or aperture in the bed of the machine 20 or an advantageous arrangement of reflective surfaces is utilized to access the codes.

After processing at the flap opening station 40, individual opened cartons 34 are feed to a stamp applicator station 42 wherein jurisdictional tax stamps are applied to the ends of the individual cigarette packages within each carton. After the tax stamps have been applied, the cartons pass into a flap resealing station 44. Upon exiting the tax stamping machine 20, the cartons comprising the order are packed for shipment at a packing station 46.

In the event the processor 24 detects an incorrect item in the induction zone 38, a signal is generated to the interrupt interface 30, which may be hard wired to an existing limit switch that controls the movement of an induction belt of the stamping machine 20, to interrupt operation of the induction belt.

Figure 3:
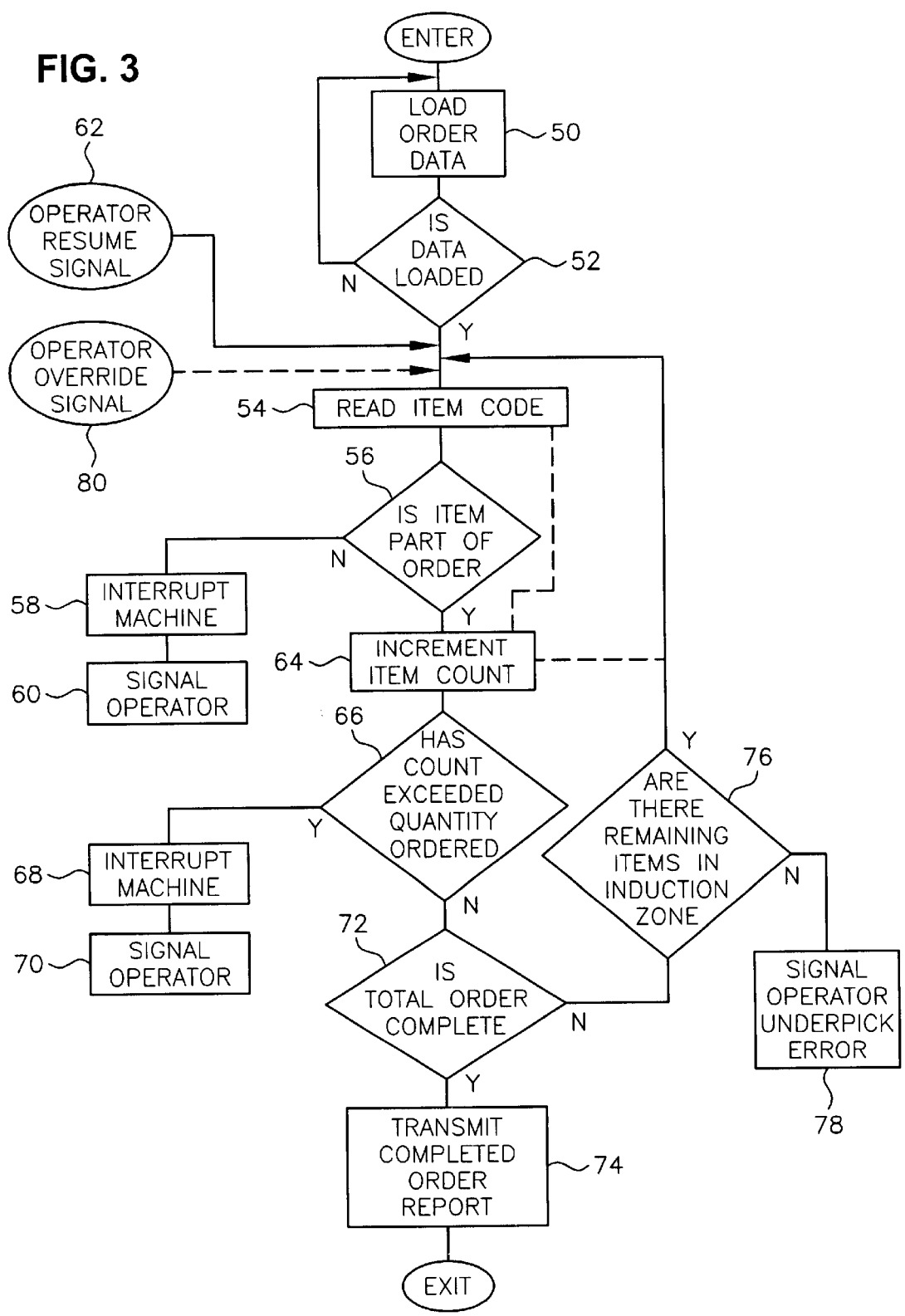
FIG. 3 is a schematized diagrammatic representation of a typical routine of the verification system processor pursuant to which value added indicia is applied only to items which have been properly picked in fulfillment of an order.

Referring now to FIG. 3, wherein a typical routine of the verification system processor 24 is depicted, it will be noted that initially, the data comprising the requirements of a specific order which has been picked is loaded into the processor 24, as depicted in a block 50. An inquiry is then made as to whether or not the order data has been loaded as indicated in a block 52.

Thereafter, the processor reads the scanned code data of the initial item within the induction zone 38, as indicated in a block 54. It should be noted that the sensor 26 may also include an object sensor such as a photo-detector 27 which senses the presence of a carton 34 in the induction zone and generates a signal received by the processor 24, such that the processor 24 can anticipate the arrival of scanned data and detect failure of the sensor 26 to scan or transmit data. If the sensor fails to scan or transmit data, an error signal is generated and the interface 30 is activated to interrupt operation of the machine.

After the scanned item code has been read, the processor determines whether the item is part of the requirements of the order stored in its memory, as indicated in an inquiry block 56. If the item is not part of the order, the processor activates the interface 30 to interrupt operation of the machine as indicated in a block 58 and also signals the operator, as indicated in a block 60. The operator may then remove the incorrect item and substitute a correct item which is part of the order. After placing a correct item in the induction zone, the operator actuates a switch to generate a resume signal for resetting the interrupt interface 30, as indicated at 62.

If the inquiry in the block 56 results in a determination that the scanned item is part of the order, the processor then increments the item count, as indicated in a block 64 and proceeds with an inquiry as to whether or not the item count exceeded the requirements of the stored order, as indicated in a block 66. If the count exceed the requirements of the order, the processor interrupts operation of the machine as indicated in a block 68 and signals the operator as indicated in a block 70.

In the event the item count has not exceeded the requirements of the order, the processor proceeds to a further inquiry as to whether or not the order is complete, as indicated in a block 72. If the order is complete, the processor transmits a completed order report to the distribution center processor 12, as indicated in a block 74.

In the event the order is not complete, the processor proceeds with an inquiry as to whether or not there are remaining items in the induction zone, as indicated in a block 76. If there are no remaining items, the processor signals the operator that there has been an under picking error, as indicated in a block 78.

If, upon entry into the inquiry block 76, the processor 24 determines that there are remaining items in the induction zone, the processor returns to the block 54 and commences to read the next sequential scanned item code.

It should be understood that the machine operator has the option of overriding the verification system processor's determination, in the block 56, that an item scanned is not part of the requirements of the order or the determination, in the block 66, that the item scanned is in excess of the requirements of the order. In such event, the operator will activate an operator override signal, indicated at 80. Upon receipt of the operator override signal, the interrupt interface 30 is reset, the processor 24 enters the block 54 and reads the scanned code and thereafter proceeds along a dashed line path to the block 64. incrementing the scanned item count and then returns to the block 54 for reading the scanned code of the next sequential item.

It should be noted that the routine may be modified such that items comprising the total requirements of the order must be segregated and sequentially feed through the induction zone, rather than being mixed. In such event, a modified routine depicted in FIG. 4 will be utilized, After the processor 24 reads the item code in the block 54, it enters an inquiry block 56a which ascertains whether or not the scanned code identifies an item which is sequentially part of the order being processed.

The modified routine depicted in FIG. 4 also provides that after the program exits the inquiry block 66 and the processor 24 has ascertained that the item count has not exceeded the quantity ordered, it enters an inquiry block 72a, wherein a determination is made whether or not the item total has been reached. If the item total has not been reached, the processor enters the inquiry block 76 and proceeds as previously discussed.

In the event the item total has been reached, the processor 24 enters an inquiry block 80a and determines whether or not there are remaining item codes in the requirements of the order being processed. In the event there are remaining items codes, the processor 24 will accept the next sequential item code in the inquiry block 56a, as indicated in a block 82a, and returns to the block 54. In the event there are no remaining codes, the processor 24 transmits a completed order report as indicated in a block 74a.

While the verification system for a value added indicia applicator has been described with reference to cigarette tax stamping machines, it should be appreciated that he present invention is equally well suited for use in conjunction with processing of orders wherein any type of value added indicia is to be applied.

Thus is will be seen that there is provided a verification system for value added indicia applicators which achieved the various aspects, features and considerations of the present invention and which is well adapted to meet the conditions of practical usage.

As various changes might be made to the verification system without departing from the sprit of the invention, it is to be understood that all matters herein described or shown in the accompanying drawings are to be interrupted as illustrative and not in a limiting sense.

Having thus described the invention, there is claimed as new and desired to be secured by Letters Patent:

1. An order verification system for a distribution center wherein value added indicia is applied to distributed items, the verification system comprising a processor, the processor storing data comprising item requirements of an order being processed at the distribution center, a sensor operatively connected to the processor, the sensor detecting an identification code associated with each successive item in a flow path of a picked quantity of items selected in satisfaction of the order being processed, the sensor generating an identification code signal indicative of the detected identification code, the processor receiving the identification code signal and in response thereto, determining whether the identification code signal corresponds to the stored data item requirements of the order, the processor preventing value added indicia from being applied to an item in the flow path which does not correspond to the stored data item requirements of the order.

2. An order verification system as constructed in accordance with claim 1 further including a value added indicia applicator, the verification system including an applicator interrupt interface, the applicator interrupt interface being operatively coupled to the processor and to the value added indicia applicator, the processor actuating the interrupt interface to prevent value added indicia from being applied to an item which does not correspond to the stored data item requirements of the order.

3. An order verification system as constructed in accordance the claim 1 further including a value added indicia applicator, the verification system including an item ejector, the item ejector being operatively coupled to the processor and to the applicator, the processor actuating the item ejector to eject from the flow path an item which does not correspond to the stored data item requirements of the order.

4. An order verification system as constructed in accordance with claim 1 wherein the sensor comprises an optical scanner.

5. An order verification system as constructed in accordance with claim 4 when the identification code comprises an imprinted bar code.

6. An order verification system as constructed in accordance with claim 1 wherein the value added indicia applicator comprises a cigarette tax stamping machine and the items comprise cigarette packages carried in cartons.

7. An order verification system as constructed in accordance with claim 6 wherein the cigarette tax stamping machine includes an induction zone and the flow path extends into the induction zone, the sensor being positioned to detect the identification codes associated with the cartons in the induction zone.

8. An order verification system as constructed in accordance with claim 7 wherein the cigarette tax stamping machine further includes a carton flap opening station, the carton flap opening station being adjacent the induction zone, the sensor being positioned to detected the identification codes associated with cartons passing from the induction zone into the carton flap opening station.

9. An order verification system as constructed in accordance with claim 7 further including an interrupt interface, the interrupt interface being operatively coupled to the processor and to the cigarette tax stamping machine, the interrupt interface being engaged to interrupt the flow of cartons within the induction zone.

10. A method of assuring that value added indicia will not be applied to items which are not intended for fulfillment of a current order which has been picked, the method comprising the steps of:
 a) transporting picked items along a flow path toward a value added indicia applicator,
 b) scanning successive conveyed items in the flow path,
 c) determining if the item scanned is in fulfillment of the current order,
 d) preventing the value added indicia applicator from applying value added indicia to the item scanned if the item scanned is not in fulfillment of the current order, and
 e) permitting the value added indicia applicator to apply value added indicia to the item scanned if the item scanned is in fulfillment of the current order.

11. A method of assuring that value added indicia will not be applied to items which are not intended for fulfillment of a current order in accordance with claim 10 further including the step of storing data comprising the requirements of the current order, the step of determining including the step of comparing a scanned identification code with the stored data.

12. A method of assuring that value added indicia will not be applied to items which are not intended for fulfillment of a current order in accordance which claim 10 wherein the order includes quantities of different items, each item having a unique identification code, the step of preventing the value added indicia applicator from applying value added indicia to a scanned item occurring upon each instance that a new identification code is scanned prior to scanning the total number of ordered items of the previously scanned identification code.

13. A method assuring that value added indicia will not be applied to items which are not in fulfillment of a current order in accordance with claim 10 further including the step of sensing successive items in the flow path prior to scanning each item and the step of generating an error signal in the event a sensed item is not scanned.

14. A method of assuring that value added indicia will not be applied to items which are not intended for fulfillment of a current order in accordance with claim 10 wherein the value added indicia applicator comprises a cigarette tax stamping machine having an induction zone and the flow path extends through the induction zone, the step of preventing including the step of interrupting the flow of items through the induction zone.

15. A method of assuring that value added indicia will not be applied to items which are not intended for fulfillment of current order in accordance with claim 14 wherein the cigarette tax stamping machine includes an induction belt, the step of interrupting including the step of disabling the induction belt.

16. A verification system for precluding the inadvertent application of tax stamps to untaxed items which are not part of a current ordering being processed, the system comprising a verification system processor, the verification system processor storing data comprising the item requirements of the current order of untaxed items being processed, successive picked untaxed items intended for fulfillment of the current order being positioned along a flow path, a sensor positioned to detect product identification codes of the untaxed items in the flow path, the sensor operatively connected to the verification system processor, the sensor generating a product identification code signal corresponding to a detected product identification code, the verification system processor receiving the product identification code signal and comparing the product identification code signal with the stored data comprising the item requirements of the current order being processed and generating an operator alert signal for precluding the inadvertent application of tax stamps in the event the identification code signal does not correspond with the stored data.

17. A verification system for precluding the inadvertent application of tax stamps as constructed in accordance with claim 16 wherein the flow path includes an induction zone, the sensor being positioned to detect identification codes associated with untaxed items in the induction zone.

18. A verification system for use with a precluding the inadvertent application of tax stamps as constructed in accordance with claim 16 further including an item distribution center, the distribution center including a distribution center order processor, a communications link between the distribution center order processor and the verification system processor, the verification system processor receiving the data comprising the item requirements of a current order being processed from the distribution center order processor, the verification system processor determining if in the item requirements of a current order being processed is complete and generating a completed order report, the verification system processor transmitting the completed order report to the distribution center order processor.

19. A verification system for precluding the inadvertent application of tax stamps as constructed in accordance with claim 16 further including an interrupt interface, the interrupt interface being operatively connected to the verification system processor and to a machine for applying tax stamps the verification system processor actuating the interrupt interface to prevent tax stamps from being applied when the operator alert signal is generated.

20. A verification system for precluding the inadvertent application of tax stamps as constructed in accordance with claim 19 wherein the flow path includes an induction zone, the interrupt interface being actuated to interrupt the flow of items along the flow path within the induction zone.

* * * * *